United States Patent [19]
Kleykamp

[11] 3,715,454
[45] Feb. 6, 1973

[54] HOSE CONSTRUCTION

[75] Inventor: Donald L. Kleykamp, Springboro, Ohio

[73] Assignee: Dayco Corporation, Dayton, Ohio

[22] Filed: Jan. 3, 1972

[21] Appl. No.: 214,810

[52] U.S. Cl. .................174/47, 138/121, 138/122, 138/172
[51] Int. Cl. .........F16l 11/12, F16l 11/10, A47l 9/24
[58] Field of Search .....174/47, 68 C, 70 R; 138/103, 138/110, 118, 121, 122, 172, 173, 174; 156/143, 144

[56] References Cited

UNITED STATES PATENTS

| | | | |
|---|---|---|---|
| 2,073,335 | 3/1937 | Connell | 174/47 UX |
| 2,143,960 | 1/1939 | Stalter et al | 138/121 UX |
| 2,898,940 | 8/1959 | Cole, Jr. | 138/121 |
| 3,047,026 | 7/1962 | Kahn | 138/121 X |
| 3,277,231 | 10/1966 | Downey et al | 174/47 |
| 3,300,571 | 1/1967 | Downey et al | 174/47 |
| 3,578,777 | 5/1971 | De Gain | 138/122 X |

FOREIGN PATENTS OR APPLICATIONS

| | | | |
|---|---|---|---|
| 21,188 | 4/1961 | East Germany | 138/121 |

*Primary Examiner*—Laramie E. Askin
*Attorney*—Reuben Wolk

[57] ABSTRACT

An elongated differential fluid pressure formed flexible hose is provided and has an inner portion defined by a plurality of spaced tubular segments interconnected by a plurality of integral convolutions which extend outwardly from the segments. The convolutions have a plurality of recesses therein arranged in aligned relation to define at least one groove which extends the full length of the hose. A flexible hose-reinforcing member is arranged in each groove and attached to the hose along its full length.

22 Claims, 11 Drawing Figures

PATENTED FEB 6 1973 3,715,454

HOSE CONSTRUCTION

BACKGROUND OF THE INVENTION

The vacuum cleaner hose industry is a highly competitive one and usually the most commercially successful hose constructions are the ones which have the desired structural strength and flexibility and are produced with optimum economy.

The hose constructions proposed heretofore for use with vacuum cleaners are generally comparatively expensive in that they employ an excessive amount of structural material to define the air-carrying hose portion of the hose construction or where this hose portion is made using a comparatively small amount of material, the material utilized to reinforce such hose portion is unnecessarily expensive thereby increasing the overall cost of such hose construction.

SUMMARY

This invention provides a hose construction particularly adapted for use in vacuum cleaner applications and which is produced by differential fluid pressure forming processes including blow molding using a pressurized gas such as air or molding utilizing a partial vacuum. The hose construction comprises an air carrying hose which has a minimum wall thickness for the intended application; however, the overall strength of the hose construction is comparatively high because it is reinforced by a comparatively inexpensive reinforcing material. In embodiments of this invention wherein the reinforcing material is comparatively more expensive because it has an electrical conductor provided as a part thereof the unique hose construction of this invention enables the amount of such comparatively expensive material and the overall cost to be kept at a minimum.

Other details, uses, and advantages of this invention will be readily apparent from the exemplary embodiments thereof presented in the following specification, claims and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
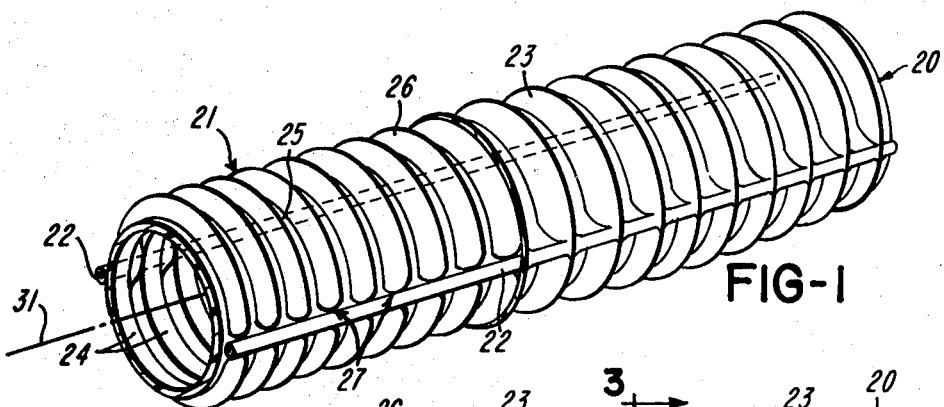
FIG. 1 is a perspective view with parts broken away illustrating one exemplary embodiment of the hose construction of this invention.

Reference is now made to FIG. 1 of the drawings which illustrates one exemplary embodiment of the hose construction of this invention which is designated generally by the reference numeral 20. The hose construction 20 comprises a flexible hose 21 made of a single thickness of elastomeric material by differential fluid pressure forming such as blow molding or vacuum forming, a plurality of two flexible plastic members 22 extending substantially the full length of the hose 21 and in a manner to be described in detail subsequently, and an outer sleeve-like cover 23.

Figure 2:
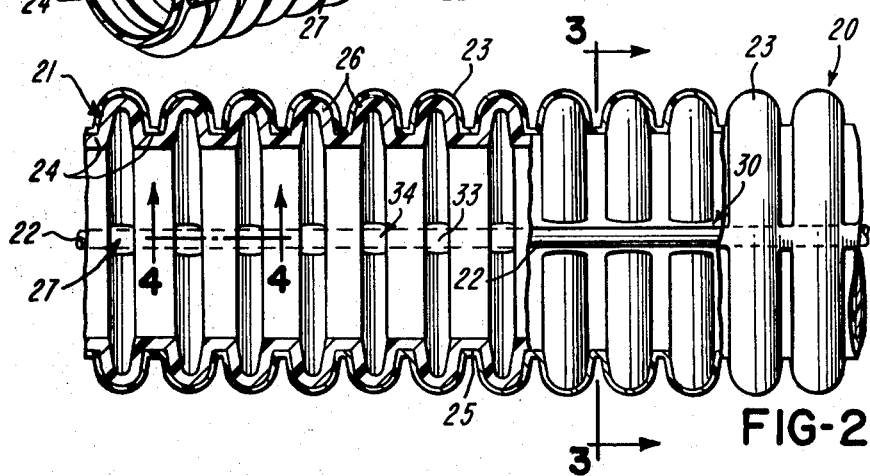
FIG. 2 is a side view with parts in cross section and parts broken away of the hose construction of FIG. 1.

As seen in FIGS. 1 and 2, the hose 21 has an inner portion defined by a plurality of tubular segments each designated by the reference numeral 24 and each having a cylindrical outside surface 25 and the tubular segments are interconnected by a plurality of convolutions 26 which are defined as an integral part of the flexible hose 21 and extend radially outwardly from the outside surface 25 of the tubular segments 24. The hose 21 has a plurality of recesses 27 in the convolutions 26 and the recesses define a plurality of sets of recesses with each set having its recesses 27 arranged in substantially aligned end-to-end relation to define an associated groove 30 which in this example is shown as extending the full length of the hose 21.

In this example, two sets of recesses and, hence, two grooves 30 are defined in the convolutions 26 whereby a pair of flexible members 22 comprise the hose construction 20 and each flexible member 22 is received within an associated groove 30. Each groove 30 extends along the hose construction 20 so that its associated flexible member 22 is attached in position against the cylindrical outside surfaces 25 of the tubular segments 24 and each outside surface 25 of this example is a substantially right circular cylindrical surface.

Each groove 30 together with an associated flexible member 22 attached or bonded in position therewithin, extends substantially parallel to the longitudinal axis 31 of the hose 21 with such hose in an unbent or straight condition. As will be apparent from FIG. 3, each flexible member 22 is in the form of a tubular plastic member having a substantially circular peripheral cross-sectional outline as illustrated at 32 and a comparatively thin wall. The members 22 serve as reinforcing members for the hose construction 20 allowing such hose construction to withstand greater pressures and more abuse while not adversely affecting the flexibility of the hose construction during normal use in a vacuum cleaner or similar application.

Figure 3:
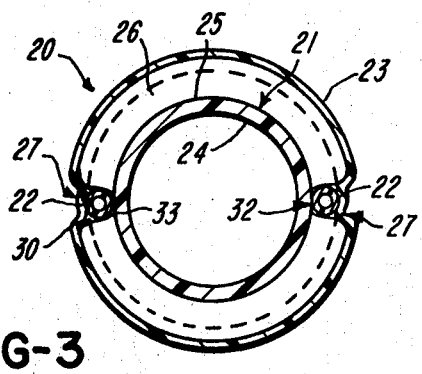
FIG. 3 is a view taken on the line 3—3 of FIG. 2.
Figure 4:
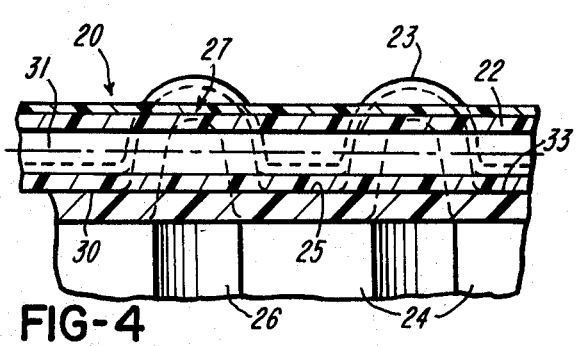
FIG. 4 is an enlarged fragmentary cross-sectional view taken on the line 4—4 of FIG. 2.
Figure 5:
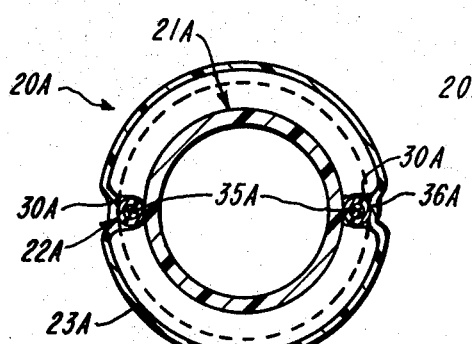
FIG. 5 is a view similar to FIG. 3 illustrating another exemplary embodiment of the hose construction of this invention.
Figure 6:
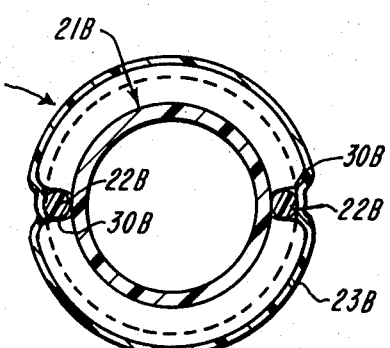
FIG. 6 is a view similar to FIG. 3 illustrating another exemplary embodiment of the hose construction of this invention.

The outer cover 23 of the hose construction 20 is a sleeve-like cover made of an elastomeric material and is formed in position, as seen in FIG. 3, so that it is positioned tightly against the hose 21 and flexible members 22 and conforms closely to the outside configurations of these components. In addition, it will be seen particularly in FIG. 4 that the outermost surface of member 22 is within an imaginary right circular cylindrical sleeve engaging the outer peripheries of the convolutions 26 while the innermost surface of member 22 engages not only cylindrical surfaces 25 but also the bottom surface 33 of each recess 27 with the innermost portions of bottom surfaces 33 being in end-to-end alignment with surfaces 25 to define a smooth narrow planar strip 34 which with the hose 21 unbent extends the full length of such hose and parallel to longitudinal axis 31.

Other exemplary embodiments of hose constructions of this invention are illustrated in FIGS. 5, 6, 7–8, 9–10, and 11 and the hose constructions illustrated in FIGS. 5, 6, 7–8, 9–10, and 11 are similar to the hose construction 20; therefore, such hose constructions will be designated by the reference numerals 20A, 20B, 20C, 20D, and 20E respectively and corresponding components of each hose construction will be designated in the drawings by the same reference numerals as in the hose construction 20, whether or not such components are mentioned in the specification, followed by an associated letter designation, either A, B, C, D, or E, and not described again in detail. Only those component parts of each hose construction which are substantially different from corresponding parts of the hose construction 20 will be designated by a new reference numeral also followed by an associated letter designation and described in detail.

The hose construction 20A has a flexible hose 21A provided with a plurality of two parallel grooves 30A each receiving a flexible member which, in this example, is designated generally by the reference numeral 22A, and an outer sleeve-like cover 23A. However, the flexible member 22A comprises an electrical conductor 35A housed in an insulating sleeve 36A which is preferably made of a material which is easily attached or bonded against the flexible hose 21A. The conductor 35A may comprise a single strand of an electrically conductive material or may be defined by a plurality of individual strands. In any event, it will be appreciated that the material used to make flexible member 22A is such that it will not appreciably affect the flexibility of the hose construction 20A.

The hose construction 20B is comprised of a flexible hose 21B and a plurality of two flexible members 22B positioned within parallel grooves 30B and an outer cover 23B. Each flexible member 22B preferably is made of a flexible plastic material and has a solid cross-sectional configuration thereby providing added strength for the hose construction 20B. However, the flexibility of the member 22B is such that it will not adversely affect the flexibility of the overall hose construction 20B.

Figure 7:
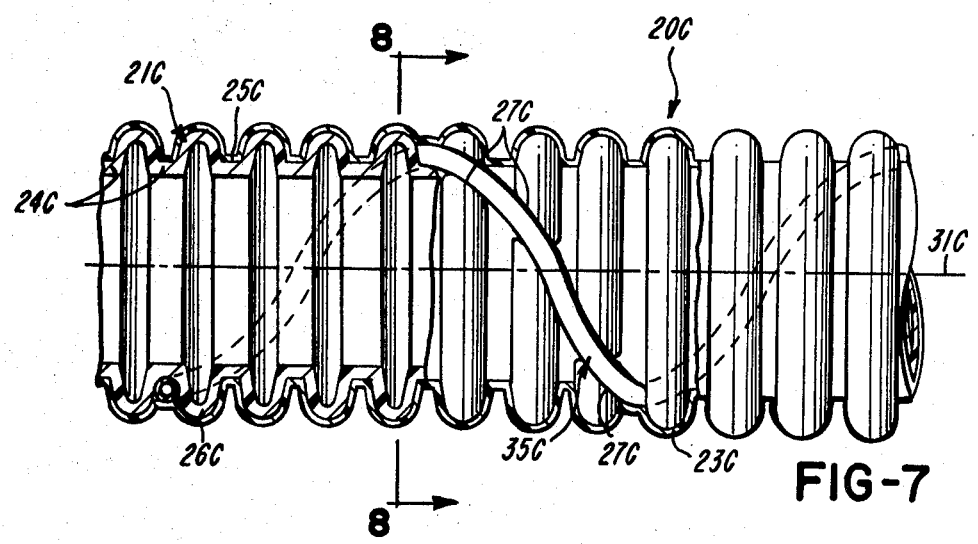
FIG. 7 is a view similar to FIG. 2 illustrating another exemplary embodiment of the hose construction of this invention.
Figure 8:
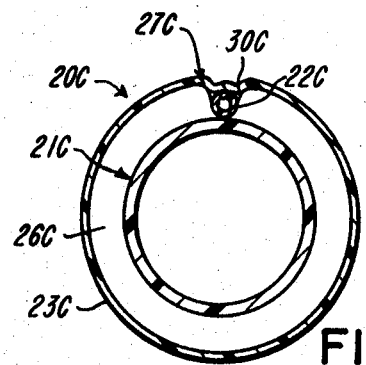
FIG. 8 is a view taken on the line 8—8 of FIG. 7.

The hose construction 20C illustrated in FIGS. 7–8 is comprised of a flexible hose 21C having an inner portion defined by a plurality of tubular segments 24C each having a right circular cylindrical outside surface 25C and with the segments 24C being interconnected by a plurality of integral convolutions 26C extending radially outwardly from the outside surfaces 25C. The flexible hose 21C has a plurality of recesses 27C in the convolutions 26C which are arranged in aligned relation to define an associated groove 30C and the groove 30C extends in a spiral pattern about the longitudinal axis 31C as illustrated at 35C whereby the flexible member 22C is nested within such groove and also extends in a spiral pattern about the longitudinal axis 31C.

The member 22C is shown as a tubular plastic member in a similar manner as the members 22 of the hose construction 20. However, it will be appreciated that the member 22C may be comprised of an electrical conductor provided with an outer insulating sleeve in a similar manner as the member 22A of the hose construction 20A or the member 22C may have a solid cross-sectional configuration in a similar manner as the member 22B of the hose construction 20B. Further, instead of a single member 22C attached against the outside surface or bonded in position within an associated spiral groove 30C with an outer cover 23C applied thereover, it will be appreciated that a plurality of spiral grooves similar to groove 30C may be provided in the hose 21C and each spiral groove may be angularly displaced from an adjacent spiral groove any desired angular increment.

Figure 10:
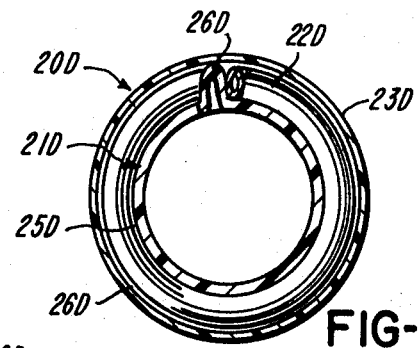
FIG. 10 is a view taken on the line 10—10 of FIG. 9.
Figure 9:
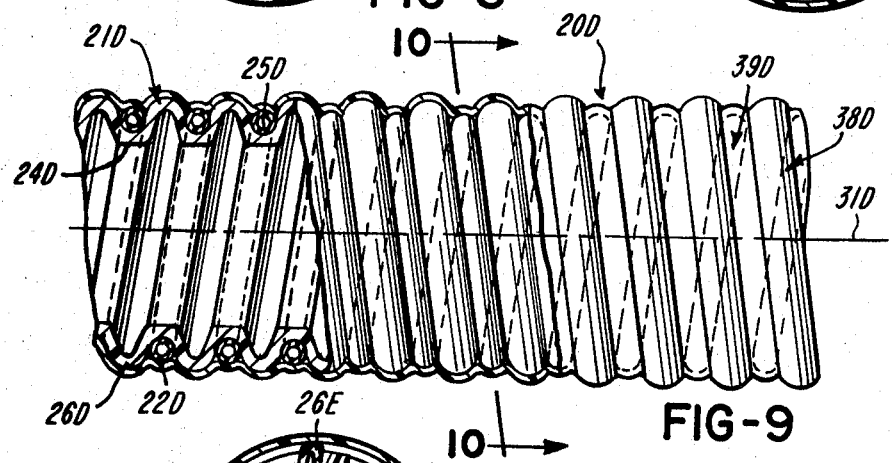
FIG. 9 is a view similar to FIG. 2 illustrating another exemplary embodiment of the hose construction of this invention.
Figure 11:
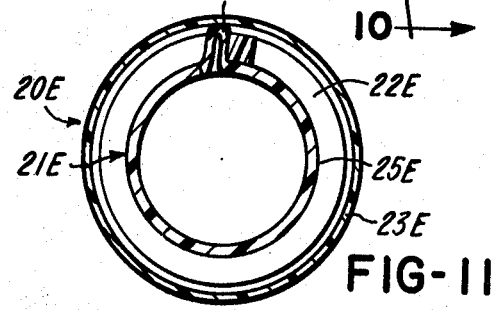
FIG. 11 is a view similar to FIG. 10 illustrating another exemplary embodiment of the hose construction of this invention.

The hose construction 20D, illustrated in FIGS. 9 and 10, comprises a flexible hose 21D having a plurality of spaced tubular segments 24D each having a right circular cylindrical outside surface 25D and integral convolutions 26D extending outwardly from surfaces 25D. The convolutions 26D are interconnected and extend in a continuous spiral, indicated at 38D, about the longitudinal axis 31D of the hose 21D and substantially along the full length of such hose. The hose 21D is preferably made with a minimum wall thickness and the flexible member 22D serves strictly as a high-strength reinforcing member of comparatively low cost.

The flexible tubular member 22D is attached against the outside surface 25D and is spirally wound between the convolutions 26D and as illustrated at 39D, for example. Further, the height or maximum peripheral outline of the flexible member 22D is such that it is nested within the peripheral outline of the convolutions 26D and the outer cover 23D is positioned tightly thereagainst to provide a compact construction.

The hose construction 20E has a flexible hose 21E provided with spiral convolutions 26E and the flexible member 22E is attached in a bonded manner against surface portions 25E and also nested between adjacent convolutions. However, instead of being a tubular plastic member, member 22E has a solid non-circular cross-sectional configuration which, in this example, is in the form of a square. As suggested previously in connection with hose construction 20B the use of a solid flexible member 22E provides even greater strength and rigidity for the hose construction 20E without appreciably increasing the cost of the hose 20E over the cost of the hose 20D. It will also be appreciated that instead of the flexible member 22E having a square cross-sectional outline, member 22E may have any suitable outline whether circular or non-circular.

The hoses 21, 21A, 21B, 21C, 21D, and 21E may be made of any suitable elastomeric material. However, for optimum economy, each of these hoses is preferably made of a thermoplastic material and by continuous differential fluid (preferably gas) forming methods such as vacuum forming or blow molding using air.

The flexible members (such as the flexible members 22 of the hose 20, for example) in each of the hose constructions may be integrally bonded in position during the forming of its associated convoluted flexible hose and within an associated groove regardless of whether the groove extends parallel to the longitudinal axis of the hose or in a spiral pattern. However, each convoluted flexible hose may be formed with one or more grooves regardless of type and wound on an associated supply roll whereupon the associated flexible member may then be subsequently installed and bonded in position utilizing any suitable technique.

It is stated in this application that the flexible member is attached against its associated flexible hose. However, it will be appreciated that such attachment may, but not necessarily, be along the full length of the flexible member but may be a spot attachment at spaced intervals. It will also be appreciated that any suitable adhesive means may be employed or where either the flexible member, convoluted hose, or both, are made of a thermoplastic material the attachment may be achieved by localized heating and fusion of portions of such material to effectively bond or spot weld the flexible member in position within an associated groove.

The outer covers or sleeves comprising the various hoses 20 and 20A-E may be formed and fixed in position utilizing any technique known in the art. For example, after each flexible member (such as member 22 of hose construction 20) is attached in position, the outer cover may be formed and applied continuously around the flexible hose and the one or more reinforcing members using a cross head extruder extruding a suitable plastic material, or the like.

The hose constructions 20 and 20A-B are illustrated as having annular convolutions provided along their associated flexible hoses and utilizing a plurality of two flexible members extending in parallel relation along their lengths; however, it will be appreciated that only one flexible member or any desired number in excess of two may also be employed in defining these hose constructions and it will be further appreciated that the convolutions, instead of being annular convolutions, may be spiral convolutions, if desired. Likewise, hose construction 20C may use a plurality of spirally wound flexible members with either annular convolutions, as shown, or with spiral convolutions.

The tubular members 22, 22C, and 22D comprising hose constructions 20, 20C, and 20D respectively have been described as reinforcing members; however, it is to be understood such members may also be used to convey air to a separate device, if desired.

While present exemplary embodiments of this invention, and methods of practicing the same, have been illustrated and described, it will be recognized that this invention may be otherwise variously embodied and practiced within the scope of the following claims.

What is claimed is:

1. A hose construction comprising, an elongated differential fluid pressure formed flexible hose made of an elastomeric material, said hose having an inner portion defined by a plurality of spaced tubular segments each having a cylindrical outside surface with said segments being interconnected by a plurality of integral convolutions extending radially outwardly from said outside surface, and a flexible member made of a nonmetallic material and being attached against said outside surface substantially along the full length of said hose and providing reinforcing therefor.

2. A hose construction as set forth in claim 1 in which said tubular segments and said outside surfaces are substantially right circular cylindrical in configuration.

3. A hose construction as set forth in claim 1 in which said convolutions are interconnected and extend in a continuous spiral along the length of said hose, and said flexible member engages said outside surface of each of said segments and extends in a continuous spiral along the length of said hose.

4. A hose construction as set forth in claim 3 in which said elastomeric material is in the form of a thermoplastic material.

5. A hose construction as set forth in claim 4 and further comprising a cover made of a plastic material positioned tightly against said hose and flexible member and conforming closely to the outside configurations thereof.

6. A hose construction as set forth in claim 3 in which said flexible member is made of a solid plastic material.

7. A hose construction as set forth in claim 3 in which said flexible member is made of a tubular plastic material.

8. A hose construction as set forth in claim 1 and further comprising a plurality of recesses in said convolutions arranged in aligned relation to define a groove which extends the full length of said hose and receives said flexible member therewithin.

9. A hose construction as set forth in claim 8 in which said groove and member extend substantially parallel to the longitudinal axis of said hose.

10. A hose construction as set forth in claim 8 in which said groove and member extend in a spiral pattern about the longitudinal axis of said hose.

11. A hose construction comprising, an elongated flexible hose having a plurality of axially spaced convolutions provided as an integral part thereof, a plurality of recesses in said convolutions arranged in aligned relation to define a groove which extends substantially the full length of said hose, and a flexible member arranged within said groove and being attached to said hose.

12. A hose construction as set forth in claim 11 in which said groove and member extend substantially parallel to the longitudinal axis of said hose.

13. A hose construction as set forth in claim 11 in which said groove and member extend in a spiral pattern about the longitudinal axis of said hose.

14. A hose construction as set forth in claim 11 in which said flexible member is made of a plastic material and is bonded against said hose.

15. A hose construction as set forth in claim 14 in which said flexible member is a solid plastic member.

16. A hose construction as set forth in claim 14 in which said flexible member is a tubular plastic member.

17. A hose construction as set forth in claim 11 in which said flexible member comprises an electric conductor housed in an insulating sleeve which is attached to said hose.

18. A hose construction as set forth in claim 11 and further comprising a cover made of a plastic material and being urged tightly against said hose and flexible member and conforming closely to the outside configurations thereof.

19. A hose construction as set forth in claim 11 in which said convolutions are annular convolutions.

20. A hose construction as set forth in claim 11 in which said convolutions are spiral convolutions.

21. A hose construction as set forth in claim 11 in which said plurality of recesses in said convolutions define a first set of recesses which define said groove and further comprising additional recesses in said convolutions arranged in aligned relation to define at least a second set of recesses and at least another groove which extends substantially the full length of said hose, and a second flexible member arranged within said second groove and being attached to said hose.

22. A hose construction as set forth in claim 11 in which said convolutions are annular convolutions, said plurality of recesses define a plurality of sets of recesses with each set defining a groove in addition to said first named groove, and further comprising at least another flexible member with the total number of flexible members corresponding in number to the number of sets of grooves.

* * * * *